Oct. 21, 1969  J. C. BROWN  3,473,593
TIRE CHAIN MOUNTING ARRANGEMENT
Filed Dec. 18, 1967
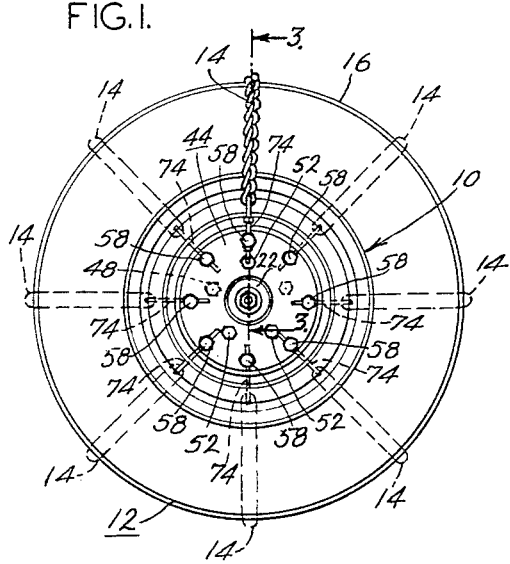
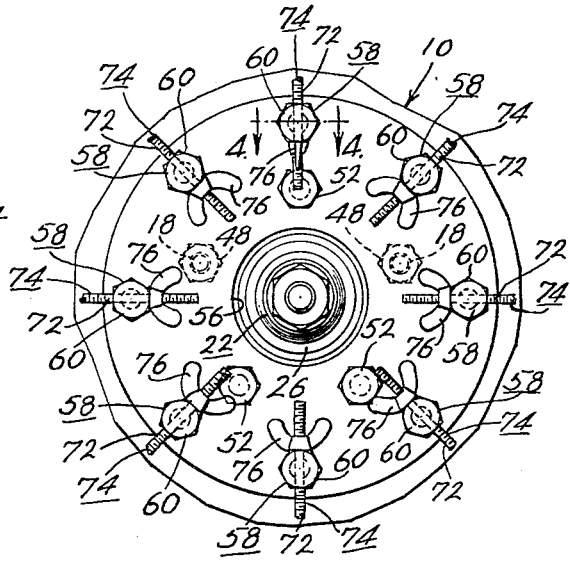
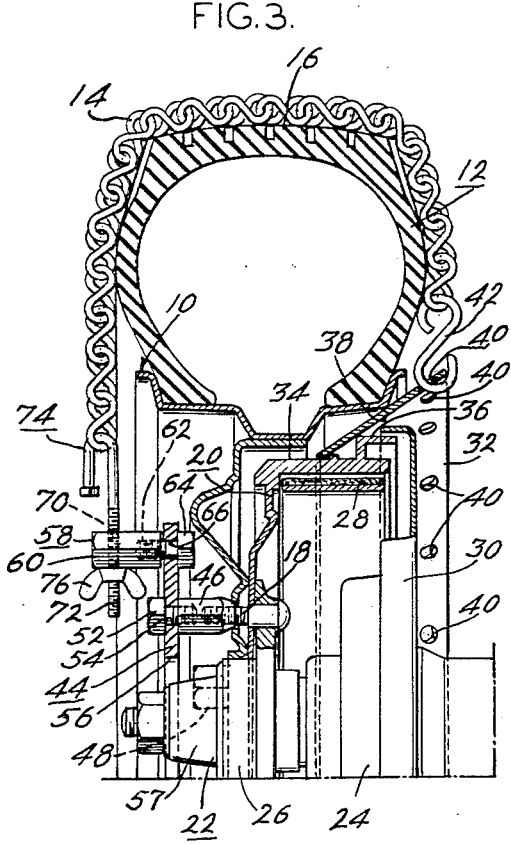
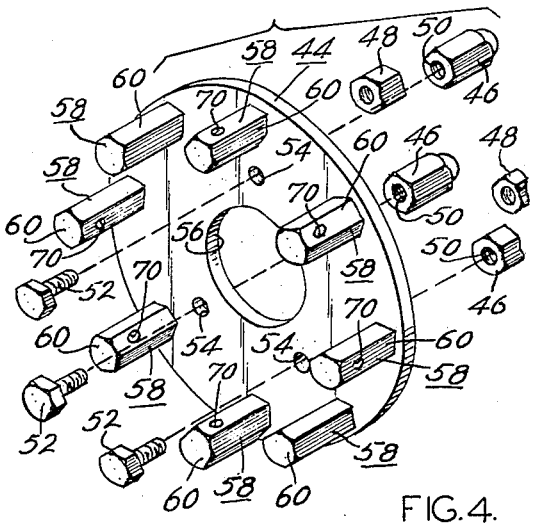
INVENTOR:
JOHN C. BROWN
BY *Howson & Howson*
ATTYS.

3,473,593
TIRE CHAIN MOUNTING ARRANGEMENT
John C. Brown, 304 Maple Ave., Delanco, N.J. 08075
Filed Dec. 18, 1967, Ser. No. 691,448
Int. Cl. B60c 27/04
U.S. Cl. 152—233                          5 Claims

ABSTRACT OF THE DISCLOSURE

An arrangement for attaching the outer ends of individual tire cross chains to a wheel including an annular plate mounted coaxially with and spaced outwardly from the wheel by three or more elongated lug nuts. A plurality of chain attachment elements are rotatably mounted around the periphery of the annular plate. J-bolts on the ends of the chains pass through transverse holes in the attachment elements and are provided with wing nuts for adjusting the tension of the chains.

---

The present invention relates generally to arrangements for mounting anti-skid tire chains on vehicle wheels and relates more particularly to an arrangement for mounting the outer ends of a selected number of individual cross chains to a wheel.

In an effort to avoid the difficulties attending the installation of conventional tire chains, a number of arrangements have been suggested in the past for securing a selected number of individual cross chains to a vehicle wheel. Two such arrangements are set forth in my U.S. Patent 3,151,655, issued Oct. 6, 1964 and in my copending application Ser. No. 574,335 filed on Aug. 23, 1966, now Patent No. 3,362,450, issued Jan. 9, 1968. While each of these previous developments has disclosed a satisfactory arrangement for securing the inner ends of the cross chains, in neither arrangement nor in the prior art has a completely satisfactory means been developed for securing the outer ends of the chains to the wheel. A shortcoming of my two above-mentioned developments is the required aligning of the wheel lug nuts with the chain securing devices. As a result, the lug nuts are not necessarily tightly securing the wheel to the brake drum. Though the lug nuts could not come off, a loose wheel especially with chains mounted thereon would cause rapid wear, excessive vibration and should be avoided.

A further limitation of each of the above developments is the restricted space available for tightening the wing nuts of the J-bolts leading from the outer chain ends. Each of these bolts terminates within a circular area defined by the wheel lug nuts, which area is not as large as could be desired for this purpose.

To overcome the above problems, in the present invention an annular plate is coaxially attached to the wheel spaced outwardly therefrom by bolting to three or more elongated lug nuts which are tightly securing the wheel to the brake drum. Spaced around the periphery of the annular plate are a plurality of rotatable chain attachment elements which extend outwardly from the plate and which each include a transverse hole through which passes the threaded end of a J-bolt connected to the outer end of a cross chain. A wing nut on the end of each J-bolt permits the desired tensioning of the chain.

It is accordingly a first object of the present invention to provide an improved arrangement for mounting the outer ends of a selected number of individual anti-skid cross chains to a wheel.

A further object of the invention is to provide a chain end securing arrangement which requires no permanent modification of the wheel or hub and which attaches only to the threaded wheel lugs by means of elongated lug nuts.

Another object of the invention is to provide a chain attaching arrangement as described which does not interfere with the wheel-securing function of the wheel lug nuts.

Still another object of the invention is to provide a chain-securing arrangement as described which can be easily mounted or removed using only the tire-changing lug wrench available in every car.

A still further object of the invention is to provide a chain-securing arrangement as described of a simple, inexpensive construction which can be installed even under adverse conditions by those with less than average mechanical abilities.

Additional arguments and advantages of the invention will be more readily apparent from the following detailed description of an embodiment thereof when taken together with the accompanying drawings in which:

FIG. 1 is a side elevational view of a vehicle wheel and tire upon which is mounted an arrangement in accordance with the present invention for securing the outer ends of anti-skid cross chains;

FIG. 2 is an enlarged side elevational view as in FIG. 1 but showing only the center portion of the wheel having the chain securing arrangement mounted thereon;

FIG. 3 is an enlarged sectional view taken along line 3—3 of FIG. 1 showing the brake drum, wheel, tire and the tire chain mounting assembly;

FIG. 4 is an enlarged sectional view taken along line 4—4 of FIG. 2 and showing the rotatable mounting of one of the chain attachment elements; and FIG. 5 is a perspective exploded view of the wheel studs, annular plate with chain attachment elements mounted thereon, and the bolts securing the annular plate to the elongated studs.

Referring to the drawings, and particularly FIGS. 1 and 3 thereof, a vehicle wheel 10 having a tire 12 mounted thereon is shown equipped with a plurality of cross chains 14 which are held tightly against the tire tread 16 by the mounting assembly of the present invention. The cross chains 14 serve in a well known manner to prevent skidding and to provide added traction on surfaces covered with snow, ice or mud, as well as loose surfaces such as sand or gravel. Each of the cross chains 14 is individually mounted and tensioned, and as many chains may be mounted as required by conditions, the number of chains not being limited by the number of wheel securing studs as will presently be apparent.

As shown in FIG. 3, the wheel 10 is mounted on studs 18 extending outwardly from the brake drum 20 which is shown mounted on a rear axle assembly 22 in a conventional manner. The rear axle assembly includes inner bearing and seal 24, and outer bearing and seal 26. Mounted within the brake drum 20 is the brake shoe 28, and a brake cover 30 is provided to protect the brake surfaces.

The cross chains 14 are secured adjacent the inner side of the wheel by connection to the frusto-conical shaped chain support ring 32 which, as shown in FIG. 3, is dimensioned to fit over the outer cylindrical surface 34 of the brake drum 20. The ring 32 is clamped in the illustrated position by the flange 36 of the brake drum contacting the inner face of the ring, and the shoulder 38 of the wheel contacting the outer face of the ring. The ring is thus secured in place solely by the conventional brake drum and wheel structure, the conical angle of the ring being appropriately chosen to cooperate with the wheel and brake drum configurations. The inner edge of the ring 32, which extends well inside of the wheel 10, is provided with a plurality of closely spaced holes 40 through which hooks 42 attached to the inner ends of the cross chains 14 are adapted to pass. By providing a large number of holes 40, for example twenty-four in the preferred embodiment of the invention, it is a relatively easy step to locate one of the holes from outside of the tire and attach a hook 42 therethrough.

The wheel, axle and brake drum assembly are a well known construction and the support ring 32 has been described and claimed in my copending application Ser. No. 574,335 referred to above. The present invention is directed specifically to the mounting arrangement for securing the outer ends of the chains 14 and will now be described in detail.

The present mounting arrangement is characterized by an annular plate 44 which is concentrically mounted in outwardly spaced relation from the wheel by means of three or more elongated lug nuts 46 which are substituted for three of the standard lug nuts 48. The elongated lug nuts 46 each include in addition to an inwardly directed axial threaded bore for threadedly securing the nuts to the wheel studs 18, an outwardly opening threaded axial bore 50 into which a bolt 52 passing through one of the holes 54 in the annular plate 44 is secured. As shown in FIG. 3, the central aperture 56 of annular plate 44 is of sufficient size to permit adequate clearance for the axle end 57 which extends therethrough.

Spaced around the periphery of the annular plate 44 are the rotatably mounted outwardly directed chain attachment elements 58. The elements 58 are preferably positioned in a circular arrangement having a substantially larger diameter than the array of studs 18. In the present embodiment, as shown in FIG. 4 the chain attachment elements each comprise an elongated hex nut 60 having a threaded axial bore 62 extending partially thereinto. Bolt 64 passing through oversize hole 66 in the annular plate 44 is seated in the bore 62 and is dimensioned to provide a slight clearance 68 between the nut 60 and the annular plate 44 whereby the nut 60 is freely rotatable with respect to the plate 44.

Each of the chain attachment elements 58 includes a transverse hole 70 in the nut 60 thereof through which the threaded end 72 of a J-bolt 74 looped through the outer end of one of the chains 14 is passed. A wing nut 76 on the threaded end 72 of the J-bolt bears against the chain attachment element and provides a means for selectively tensioning the secured chain.

Installation of the present mounting arrangement may be easily accomplished using only the conventional lug wrench which is standard equipment in every car. With the hub cap removed, three of the conventional lug nuts 43 are removed from the lugs 18 and are replaced by the elongated lug nuts 46 which are tightened to secure the wheel to the brake drum. The three elongated nuts should be mounted with only two of the nuts in adjoining relation in the conventional five stud arrangement. For wheels which are secured by six lug nuts, the three elongated nuts should be alternated with the remaining original lug nuts.

With the elongated nuts 46 in place, the annular plate 44 having the chain attachment elements 58 thereon is mounted to the wheel by screwing bolts 52 into the outwardly directed bores 50 of the elongated nuts. The bolts 52 are of the same size as the lug nuts 46 and 48 and can thus be tightened using the same lug wrench. Following these few preparatory steps, the device is ready for the attachment of the cross chains and may be left on the wheel throughout the winter season for application of the chains when needed.

The attachment of the chains to the mounting arrangement is a simple operation. Each of a selected number of cross chains is attached by reaching behind the wheel with the hook 42 and inserting the hook in any one of the holes 40 of ring 32. The J-bolt 74 passing through the outer end of the chain is then inserted through one of the transverse holes 70 in the chain attachment element 58 and the wing nut 76 is tightened on the threaded end 72 of the J-bolt to provide the desired tension of the chain against the tire tread 16. Each chain may thus be mounted in a matter of seconds and may be removed with equal speed simply by removing the wing nut and unhooking the hook 42 from the ring 32.

Important advantages of the present mounting arrangement include the simplicity of attachment of the device to a wheel using only the wrench provided for changing a tire. The wheel securing lug nuts are all tightly secured before the application of the present device to the elongated studs. In the event of a flat tire, once the chains have been removed only the three bolts 52 need be removed to unmount the annular plate 44. The elongated and conventional lug nuts 46 and 48 are then removed in the usual manner to permit changing of the tire.

The rotational mounting of the chain attachment elements 58 permits the alignment of the holes 70 therein with the J-bolts 74 connected to the outer ends of the tire cross chains. In addition, the spaced positioning of the chain attachment elements around the periphery of the annular plate 44 provides substantially more room for manipulating the wing nuts 76 than would be provided for example if the J-bolts passed directly through the wheel stud lug nuts. The annular plate in addition permits the attachment of more chain attachment elements than is possible with other arrangements.

The number of chains to be employed depends on the road conditions encountered, and individual cross chains may be added or removed as the conditions change. The provision of means for tensioning the individual chains holds the chains securely against the tire tread and prevents the whipping of the chains against the road surface as is common with conventional chains. Chain and tire life are as a result greatly increased, and vibration and noise are held to a minimum.

Manifestly, changes in details of construction can be effected by those skilled in the art without departing from the spirit and the scope of the invention as defined in and lmited solely by the appended claims.

I claim:

1. An anti-skid tire chain mounting arrangement for a vehicle having a brake drum and a wheel adapted to be secured thereto by nuts threaded on studs carried by the brake drum and projecting outwardly through openings in the wheel, said mounting arrangement comprising means for releasably securing and tensioning the outer end of at least one cross chain, said means comprising an annular plate, means on said studs for mounting said annular plate coaxially with said wheel, a plurality of chain attachment elements extending axially outwardly in spaced relation around the periphery of said annular plate and being rotatable with respect thereto, and means on the outer end of said chain adapted to attach said chain to one of said chain attachment elements and to selectively tension the attached chain.

2. A mounting arrangement as claimed in claim 1 wherein said chain attachment elements are disposed radially outwardly of the brake drum studs.

3. An anti-skid tire chain mounting arrangement for a vehicle having a brake drum and a wheel adapted to be secured thereto by nuts threaded on studs carried by the brake drum and projecting outwardly through openings in the wheel, said mounting arrangement comprising means for releasably securing and tensioning the outer end of at least one cross chain, said means comprising elongated nuts on at least three of the brake drum studs securing the wheel to the brake drum, an annular plate mounted upon said elongated nuts coaxially with the wheel, a plurality of chain attachment elements extending axially outwardly in spaced relation around the periphery of said annular plate and being rotatable with respect thereto, a transverse hole in each said chain attachment element, a bolt connected to the outer end of said cross chain and adapted to pass through one of said holes in said chain attachment elements, and a nut on said latter bolt for tensioning the cross chain about the vehicle tire.

4. An anti-skid tire chain mounting arrangement as claimed in claim 3 wherein said chain attachment elements are disposed radially outwardly of the brake drum studs to facilitate the tightening of the chain bolt nut.

5. An anti-skid tire chain mounting arrangement as claimed in claim 3 wherein said elongated nuts include a threaded axial outwardly opening bore to receive bolts securing the annular plate thereto.

References Cited

UNITED STATES PATENTS

| | | | |
|---|---|---|---|
| 2,212,076 | 8/1940 | Rollings | 152—218 |
| 3,151,655 | 10/1964 | Brown | 152—233 |
| 3,362,450 | 1/1968 | Brown | 152—233 |

ARTHUR L. LA POINT, Primary Examiner

C. B. LYON, Assistant Examiner

U.S. Cl. X.R.

152—218